Figure 1:
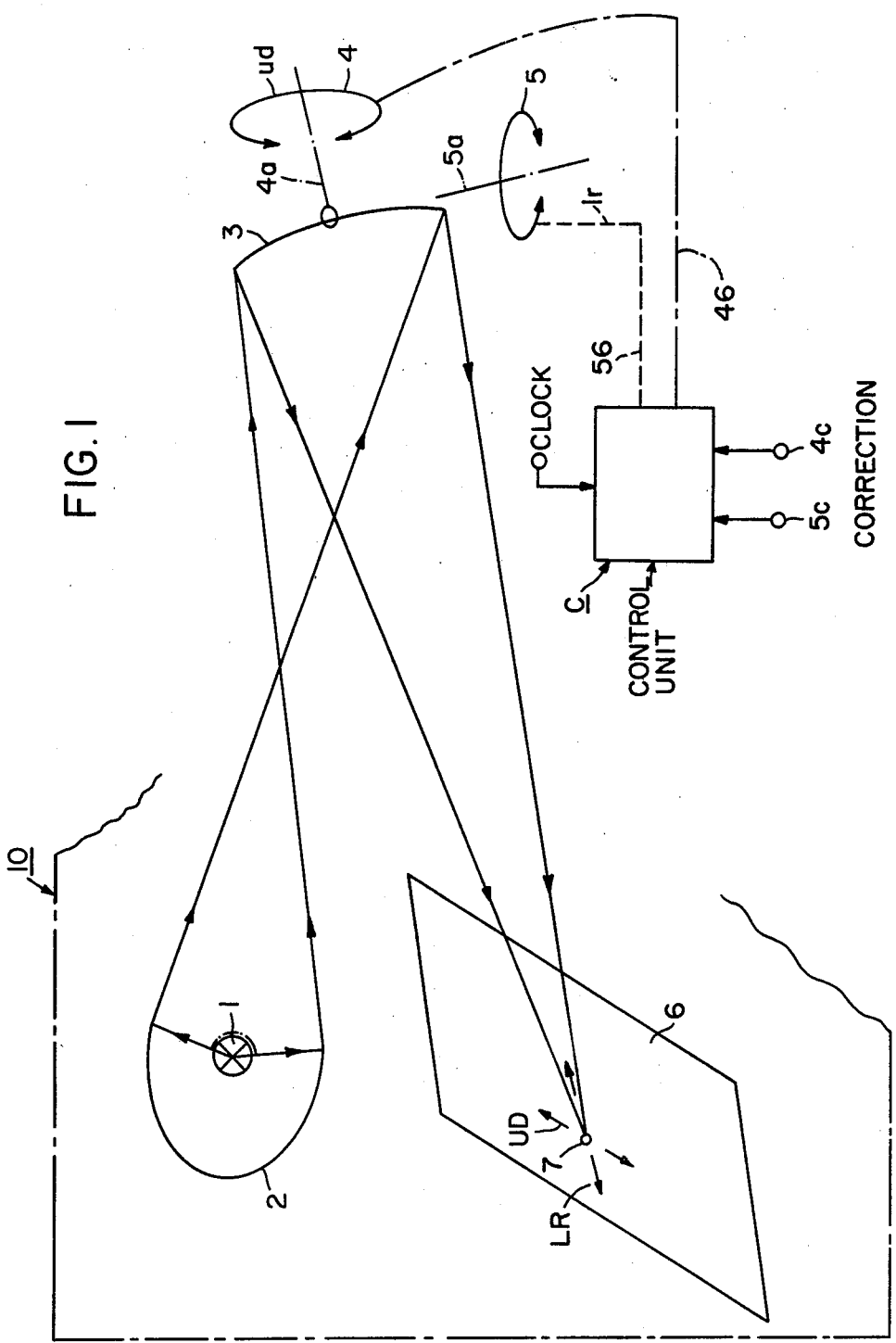

United States Patent [19]

Rath

[11] 4,452,528
[45] Jun. 5, 1984

[54] OPTICAL REPRODUCTION METHOD AND APPARATUS

[75] Inventor: Günter Rath, Goldbach, Fed. Rep. of Germany

[73] Assignee: W. C. Heraeus GmbH, Hanau, Fed. Rep. of Germany

[21] Appl. No.: 356,439

[22] Filed: Mar. 9, 1982

[30] Foreign Application Priority Data

Mar. 13, 1981 [DE] Fed. Rep. of Germany ....... 3109597

[51] Int. Cl.³ ..................... G03B 27/48; G03B 27/50; G03B 27/70
[52] U.S. Cl. ..................................... 355/51; 346/108; 350/6.6; 354/4; 355/67
[58] Field of Search ................. 355/67, 69, 51; 354/4; 346/108, 109; 350/486, 6.5, 6.6

[56] References Cited

U.S. PATENT DOCUMENTS

2,839,149  6/1958  Piety .............................. 346/108 X
3,814,494  6/1974  Shiragai et al. .................... 350/6
4,097,142  6/1978  Montou et al. ........................ 354/44

Primary Examiner—Richard A. Wintercorn
Attorney, Agent, or Firm—Frishauf, Holtz, Goodman & Woodward

[57] ABSTRACT

To provide line or strip form illumination of an object or image carrier, such as a drawing, design, or written material, for projection or copy machine purposes, a point source of light such as a quartz halogen lamp or a pinhole optical system is provided in which the light point is imaged by means of a movable mirror on the object or pattern, the movable mirror scanning the point source of light across the object or pattern to provide, essentially, strip illumination which can be uniform across the scanning strip by selecting an angular deflection speed of the mirror of $\omega = c \cdot \sin^2 \alpha$, or varying the deflection speed to have a longer dwell time of the light beam at selected locations to provide for light intensity maxima distributed throughout the scanned image, for example for compensation of distortion.

14 Claims, 4 Drawing Figures

OPTICAL REPRODUCTION METHOD AND APPARATUS

The present invention relates to a method and an apparatus for optical reproduction of images, for example for copying in various types of copy apparatus, such as office copiers, drawing and blueprint machines, and the like, utilizing light sources which have an elongated light emitting source, for example a slot, or an elongated light tube, so that an image along a light strip can be formed.

BACKGROUND

The light sources which were used heretofore may operate in the ultraviolet (UV) region, in the visible light range, or in the near infrared (IR) spectral range. Such light sources may have a substantial extent; they may, for example, have a length of two meters about $6\frac{3}{4}$ feet or the like and should, throughout their length, have uniform light emission.

It is difficult to make elongated light sources which have uniform light emission throughout their length of such large size. The reject rate of such lamps, in manufacture, is high. Additionally, as the lamps are used and as they age, the light distribution along the length thereof changes unpredictably, leading to warranty claims and complaints, while requiring an excessive amount of maintenance and replacement time.

THE INVENTION

It is an object to provide a copying process and apparatus which can utilize a simple light source or radiation source to provide light over an elongated strip with uniform light output quality, so that the copies to be made with the illumination generated thereby will have proper illumination throughout their width or length.

Briefly, an essentially point-shaped light source is provided, the light from which is applied to a mirror which is movable, for example in a wobble or deflection direction to image the point source in form of a scanning strip. The movement of the mirror can be very rapid.

Movement of the mirror can be controlled electronically so that the distribution of the light along the length of the light strip can vary, in dependence, for example on density or black content or reflectivity of the material to be illuminated. The intensity distribution of the light over the strip which is being illuminated thus can be controlled either for uniformity or for changes, for example with maximum intensity illumination at selected points or zones.

The light source itself can be a halogen incandescent lamp or a homogeneously illuminated small aperture diaphragm, similar to a pin hole opening. The light source can be formed by a simple lamp whose exchange is simple. Deviation of the intensity distribution of the light, for example due to minor variations in production tolerances of a filament of a light source can be compensated by varying the wobble or rocking program of the mirror.

DRAWINGS

Figure 2:
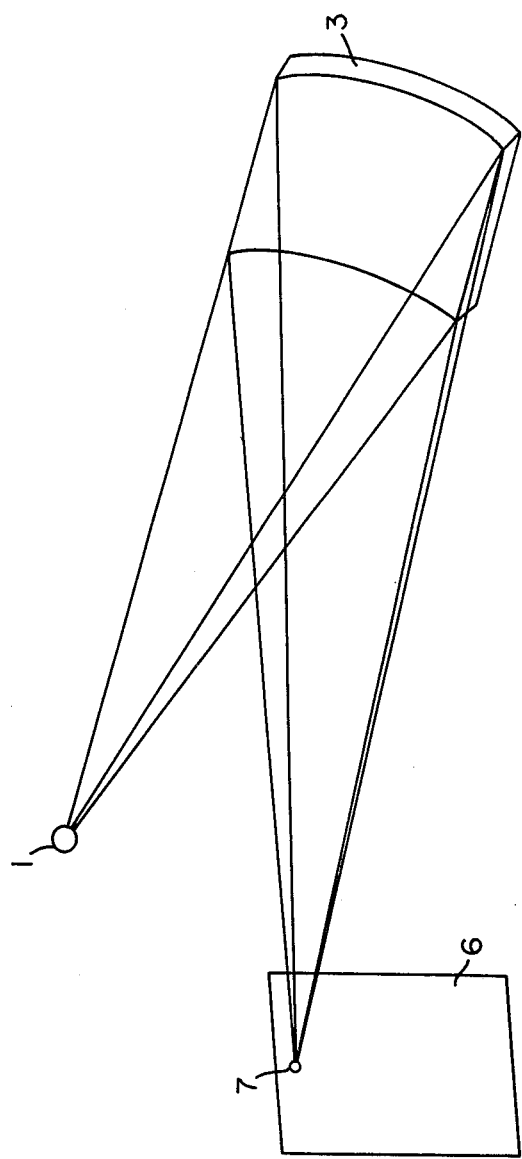
Figure 3:
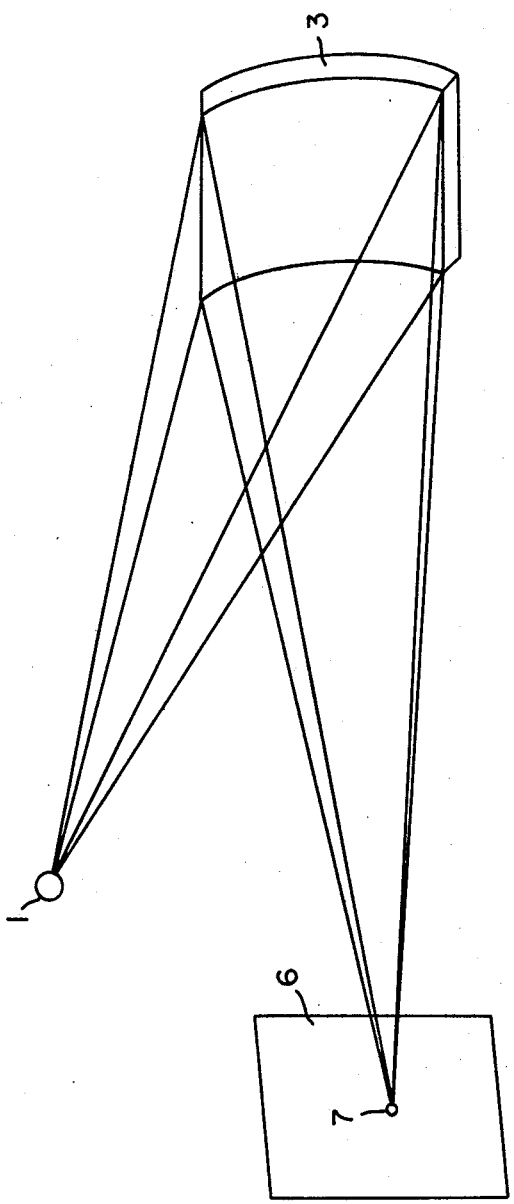
Figure 4:
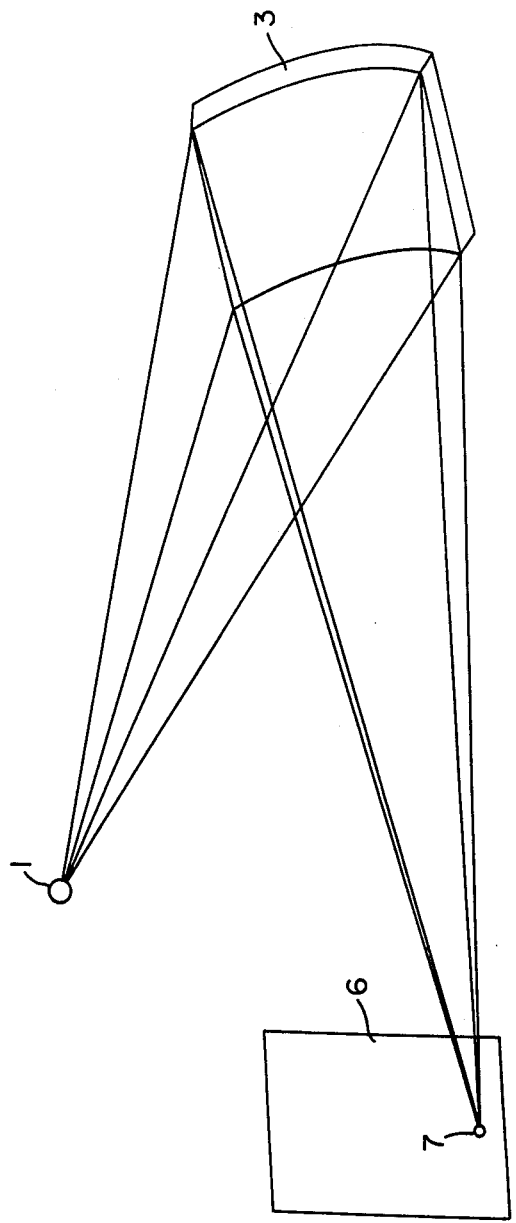

FIG. 1 is a highly schematic pictorial representation of a copying machine illustrating the system and method of the present invention; and FIGS. 2, 3 and 4 show the optical system in different positions of the electronically programmed movement of the mirror.

A light source 1—see FIG. 1—is located within a reproducing apparatus 10. The light source 1 is positioned for light reflection in a reflector 2. Preferably, the reflector 2 is a parabolic reflector, the light source 1 being essentially a point source located in the focal point of the parabolic reflector. The light rays from the source 1, as reflected by parabolic reflector 2, are directed to a mirror 3. Mirror 3 is a flicker mirror having movement about two axes 4a, 5a. The axis 4a, actually, extends at right angles to the plane of the drawing and, upon rocking movement of the mirror 3 about axis 4a back and forth as indicated by the arrow 4, will rock the mirror up-down, as shown by the notation ud in connection with mirror 4. The mirror, additionally, can tilt in and out of the plane of the drawing about axis 5a to move the mirror left–right (1r) in accordance with arrow 5.

Movement of the mirror about the respective axes of movement is controlled by a control unit C, as schematically indicated by connecting control lines 4b, 5b. They may move the mirror sequentially or simultaneously. Movement of the mirror back-and-forth about the respective axes is controlled by a timing source marked "clock" connected to the control unit C.

Depending on the respective position of the mirror 3 in accordance with a movement control program as set by the control unit C, the light dot 7 will move on the pattern 6 to form lines which, in accordance with the programmed wobble of the flicker mirror 3, will form the desired illumination of the image carrier 6. The light source 1 may be a light source which is essentially a point source; it may, however, also be a homogeneously illuminated pin hole. Approximately essentially point-shaped light sources are known, and suitable lamps are low-voltage quartz halogen lamps, or short-arc discharge lamps. Various types of copy machines use elongated mercury arc high-pressure radiators; elongated IR radiators or halogen IR radiators are used. Fluorescent lamps likewise are used, particularly in office copying machinery. All these light sources may be replaced by the light source in accordance with the present invention. Line-shaped light images or light strips are generated with uniform or non-uniform light distribution. The light strips with non-uniform light distribution, for example having maximum regions or spots or zones of intensity therealong, can be obtained by deviating from a uniform periodic angular movement of the mirror 3 about the respective axes 4a, 5a. Variation of uniformity of wobble or rocking of the mirror 3 about the respective axes can be introduced through correction terminals 4a, 5c to the control unit C.

Maximum intensity spots or zones are utilized if it is desired to compensate for imaging errors or to remove image distortion. Compensation is effected by changing the rate of wobble or movement of the mirror 3, that is, causing a longer dwell time of the movable spot of light 7 to occur at those points where a greater intensity or light energy is required. It is also possible to utilize filters in the path of the beam of light with respectively different transmission characteristics along the length thereof.

The imaging system is useful for copying machines as well as for opaque projectors, episcopes, and other projectors.

FIGS. 2-4 illustrate deflection of the light spot 7 along various positions of the carrier 6. The detailed showing of FIG. 1 has been omitted for clarity.

In most apparatus, the image carrier 6 would be movable in one direction, for example in a direction of the arrows LR, and the light beam then being moved along an up-down line UD (FIG. 1) to form a line image. Of course, the image carrier or paper 6 can also remain stationary and the light beam moved in both directions LR and UD, for example sequentially, similar to a television frame scanning, or first from one extremity in one direction, for example from the left, to the other extremity at the right, then down one step, and back from the right to the left, and so on, in a meander pattern.

The movement of the mirror can be controlled, as desired, by the unit C.

A line representation of the light dot 7 moving, for example in the LR direction, can be obtained by moving the mirror 3 with an angular speed of $$\omega = c \cdot \sin^2 \alpha$$

wherein c is a constant, and α the angle with respect to a central axis. By changing the angular velocity ω, according to a nonlinear function, a light intensity distribution with a pre-programmed illumination is obtained. The deflection of the mirror can readily generate illumination corresponding to a strip of light of substantial length with a minimum of equipment requirements, thus eliminating the need for extremely long line light sources. The clock signal introduced at the clock terminal to the control unit C can be an undulating signal controlling the speed of reciprocating motors moving the mirror along the axes 4a, 5a, at a uniform angular velocity in accordance with the above relationship, modified, if necessary, by correction signals from terminals 4a, 5c.

I claim:

1. Method of illuminating an object particularly a flat sheet-like object placed in a copy machine with a line of light extending thereacross, and utilizing an essentially point-shaped source of light comprising the steps of
   generating an at least approximate point source of light (1);
   directing the light towards a mirror (3) and imaging the essentially point source of light, reflected from the mirror, on the object as an imaged light point;
   and wobbling the mirror in an oscillating reciprocating manner about two orthogonal axes to deflect the imaged light point in a plurality of lines scanning across the object.

2. Method according to claim 1, further including the step of deflecting the mirror to provide a pattern of light of the imaged spot on the object to sequentially effectively illuminate the entire object to form an illuminated image thereof as a composite of the illuminated spots.

3. Method according to claim 1, wherein the step of generating an at least approximate point source of light comprises placing a low-voltage quartz halogen lamp at the focal point of an optical system.

4. Method according to claim 1, wherein the step of generating an at least approximate point source of light comprises placing a short-arc discharge lamp at the focal point of an optical system.

5. Method according to claim 1, wherein the step of rocking the mirror comprises rocking the mirror with an angular velocity ω of $$\omega = c \cdot \sin^2 \alpha$$

wherein c is a constant, and α the deflection angle of the mirror with respect to a central axis thereof, to obtain uniform illumination of lines with uniform intensity.

6. Method according to claim 5, further including the step of modifying the angular velocity ω of the mirror over selected portions of its movement to obtain a line imaging of the object with at least one light intensity maximum.

7. In an optical reproduction apparatus, particularly for use in a copy machine, means for uniformly illuminating an object (6), particularly a flat sheet-like object placed in the copy machine for optical reproduction comprising, in accordance with the invention,
   an essentially point-shaped source of light (1);
   an optical system (2, 3) imaging the point source of light on the object, and scanning the imaged point-source over the object, said optical system including a mirror (3) movable in an oscillating reciprocating wobble movement about two orthogonal axes (4) deflecting the light from the source on the object and imaging the point of light thereon, while moving the imaged point of light over the object in a predetermined line generating pattern, in which the lines are sequentially spaced from each other to thereby scan the object with said imaged point-source of light.

8. Apparatus according to claim 7, further including a control unit (C) controlling the speed of movement of the mirror as the spot of light is moved over the object.

9. Apparatus according to claim 7, wherein the movement of the mirror comprises a wobble movement.

10. Apparatus according to claim 7, further including means (C) controlling the wobble movement of the mirror of have an angular speed of $$\omega = c \cdot \sin^2 \alpha$$

wherein c is a constant, and α the deflection angle of the mirror with respect to a central axis thereof.

11. Apparatus according to claim 10, further including means (4c, 5c) connected to the control means (C) to vary the angular speed of movement of the spot of light to generate light intensity maxima at selected locations on the object.

12. Apparatus according to claim 7, wherein the optical apparatus comprises optical projection apparatus.

13. Apparatus according to claim 7, wherein the point-source of light is a low-voltage quartz halogen incandescent lamp.

14. Apparatus according to claim 7, wherein the essentially point-source of light comprises a short-arc discharge lamp at the focal point of an optical system.

* * * * *